United States Patent

Shurman et al.

[11] Patent Number: 5,947,442
[45] Date of Patent: Sep. 7, 1999

[54] SOLENOID ACTUATED VALVE ASSEMBLY

[75] Inventors: Rodney M. Shurman; Edward B. Manring; David L. Burt, all of Columbus, Ind.; Chafic Hammoud, Downey, Calif.; George L. Muntean, Columbus, Ind.

[73] Assignee: Cummins Engine Company, Inc., Columbus, Ind.

[21] Appl. No.: 08/927,011

[22] Filed: Sep. 10, 1997

[51] Int. Cl.⁶ .................................................. F16K 31/06
[52] U.S. Cl. .............................. 251/129.19; 251/129.16
[58] Field of Search .................. 251/129.16, 129.19, 251/129.15; 239/585.3; 137/514

[56] References Cited

U.S. PATENT DOCUMENTS

| | | |
|---|---|---|
| 3,577,107 | 5/1971 | Widl et al. . |
| 3,738,578 | 6/1973 | Farrell . |
| 3,861,643 | 1/1975 | Moffatt . |
| 4,240,056 | 12/1980 | Mayer . |
| 4,327,345 | 4/1982 | Kelso et al. . |
| 4,356,980 | 11/1982 | Krauss . |
| 4,742,964 | 5/1988 | Ito et al. . |
| 4,946,107 | 8/1990 | Hunt . |
| 4,971,116 | 11/1990 | Suzuki et al. ..................... 251/129.16 |
| 4,982,902 | 1/1991 | Knapp et al. . |
| 5,114,077 | 5/1992 | Cerny .................................. 251/129.16 |
| 5,139,227 | 8/1992 | Sumida et al. ..................... 251/129.19 |
| 5,172,887 | 12/1992 | Cross et al. ........................ 251/129.19 |
| 5,207,410 | 5/1993 | Wakeman . |
| 5,222,673 | 6/1993 | Reiter . |
| 5,301,874 | 4/1994 | Vogt et al. . |
| 5,322,260 | 6/1994 | Forbes et al. . |
| 5,341,994 | 8/1994 | Wakeman .............................. 239/585.3 |
| 5,453,821 | 9/1995 | Howes, Jr. et al. . |
| 5,503,364 | 4/1996 | Enomoto et al. .................. 251/129.16 |
| 5,513,832 | 5/1996 | Becker et al. . |
| 5,515,818 | 5/1996 | Born . |
| 5,544,815 | 8/1996 | Cooke et al. . |
| 5,548,263 | 8/1996 | Bulgatz et al. . |
| 5,615,860 | 4/1997 | Brehm et al. ...................... 251/129.16 |
| 5,626,325 | 5/1997 | Buchanan et al. . |

FOREIGN PATENT DOCUMENTS 885678  11/1981  U.S.S.R. .......................... 251/129.19

*Primary Examiner*—Denise L. Ferensic
*Assistant Examiner*—Meredith H. Schoenfeld
*Attorney, Agent, or Firm*—Sixbey, Friedman,Leedom & Ferguson; Charles M. Leedom Jr; Tim L. Brackett Jr

[57] ABSTRACT

A compact fluid flow control valve is provided which effectively and predictably controls the flow of fluid using a minimum number of components to permit inexpensive manufacture and assembly. The control valve includes a one-piece valve plunger guide and stop which extends through an aperture formed in a stator of the solenoid assembly. The valve plunger guide and stop includes an integral guide surface for guiding the valve plunger through reciprocal movement within the aperture of the stator, an integral stop surface positioned for abutment by the valve plunger when in the energized position to define a minimum air gap between an armature and the stator. The one-piece valve plunger guide and stop reduces the number of parts of the control valve to achieve simplicity in structure and lower costs while avoiding the need for a shim to set the minimum air gap. The present control valve also includes a plunger overtravel impact limiting device including a movable valve head and a hydraulic damping device. The hydraulic damping device includes a fluid passage formed between a portion of the valve plunger assembly and the valve housing. The velocity of the valve plunger assembly is substantially decreased as the valve plunger assembly squeezes fuel from the fluid passage during movement of the valve plunger toward the closed position. The plunger overtravel impact limiting device effectively reduces valve seat wear and valve bounce.

19 Claims, 2 Drawing Sheets

SOLENOID ACTUATED VALVE ASSEMBLY

TECHNICAL FIELD

This invention relates generally to an improved solenoid actuated valve assembly for a fuel system which is capable of providing accurate control of valve movement while minimizing valve bounce and maximizing valve seat life.

BACKGROUND OF THE INVENTION

Electromagnetically actuated control valves are widely used in fuel injectors and timing fluid and injection fuel metering system for precisely controlling the timing and metering of the injection fuel and timing fluid. Precise control of the timing and metering of fuel and timing fluid is necessary to achieve maximum efficiency of the fuel system of an internal combustion engine. In addition, valve designers continually attempt to reduce the size of the control valves to reduce the overall size and weight of the engine and permit the control valves to be easily mounted in a variety of locations on the engine without exceeding packaging restraints.

Another concern of valve designers is valve seat wear and valve bounce. High impact forces of the valve element against a valve seat causes valve seat beating and excessive wear. Moreover, when the valve impacts the valve seat at a high velocity, the valve tends to bounce off the seat adversely affecting the control of fluid flow and causing additional valve seat wear.

Control valves are often operated by a solenoid type actuator assembly. For example, U.S. Pat. No. 4,946,107 to Hunt discloses an electromagnetic fuel injection valve including a coil mounted on a bobbin, a core or stator extending into one end of the bobbin and an armature valve extending into an opposite end of the bobbin. One end of the armature valve includes a valve ball for engaging a valve seat while the opposite end abuts a distal end of the stator when the valve is in the open position. However, the core or stator is of the solid core magnet design which is sensitive to changes in supply voltage resulting in inadvertent movements of the valve and undesirable changes in fluid flow. In addition, when the armature valve contacts the distal end of the stator, or a shim mounted on the stator, the residual magnetism in the stator may cause the armature to be held against the stator or shim disadvantageously resulting in erratic valve performance. Although the shim may reduce the holding effect of the residual magnetism, the shim adds unnecessary costs to the valve. Also, the armature valve is guided through its reciprocal movement by a guide piece separate from the part which stops outer movement of the armature valve, i.e. stator, thereby requiring an excessive number of parts. U.S. Pat. Nos. 4,742,964; 5,301,874; 5,322,260; and 5,626,325 disclose other solenoid operated valve assemblies suffering from the same disadvantages as the actuator/valve disclosed in Hunt.

U.S. Pat. No. 5,626,325 to Buchanan et al. does disclose a solenoid operated control valve including a compliant web portion for supporting the valve seat and allowing the valve seat to flex upon contact by the valve element thereby mitigating problems of seat beating. However, the valve element contacts the valve seat at an unreduced impact velocity which may result in valve bounce and possibly excessive valve seat wear over time.

U.S. Pat. No. 5,513,832 to Becker et al. discloses a solenoid valve having a coil spring attached to one end of an armature and a spring adjustment screw abutting the coil spring, wherein the spring adjustment screw threadably engages a central threaded bore in the solenoid valve housing to allow the solenoid valve to be externally calibrated. Becker et al. further discloses a bearing which guides the longitudinal movement of a pin/armature assembly to maintain a relatively uniform radial air gap between the armature and a magnetically conductive tubular body. A stop ring is used to limit the movement of the valve into an open position. However, the stop ring is formed separate from the bearing guide resulting in an excessive number of valve parts and increased costs. Moreover, the armature is positioned within the inner radial extent of the coil assembly creating an unnecessarily wide assembly.

U.S. Pat. No. 3,861,643 is noted for disclosing a magnetic control valve having a center core of magnetic material extending through the center of the solenoid coil. A magnetic air gap is formed between the inner end of the center core and the armature. However, during operation, the armature may contact the center core since no other stop is provided. Repeated contact between the center core and the armature will result in excessive wear and possibly unacceptable damage to the armature which is normally formed of a very soft magnetic material. Moreover, the center core is a solid core magnet which is sensitive to changes in supply voltage resulting in inadvertent movements of the valve and undesirable changes in fluid flow.

Consequently, there is a need for a compact, inexpensive electromagnetic actuator assembly for a valve and an improved valve assembly capable of effectively controlling valve movement throughout all valve operating conditions.

SUMMARY OF THE INVENTION

An object of the present invention is to overcome the above-noted problems with the prior art and to provide a control valve that provides precise control of fluid flow using a simple, low cost construction.

It is another object of the present invention to provide a valve actuator assembly which is insensitive to changes in supply voltage and reduces eddy current losses.

It is yet another object of the present invention to provide a control valve which is compact and constructed of a minimal number of parts.

A further object of the present invention is to provide a solenoid operated control valve capable of external calibration by adjusting the spring force biasing the valve element without valve disassembly.

A still further object of the present invention is to provide a solenoid operated control valve which permits the minimum air gap between the armature and stator to be automatically and accurately set upon assembly of the valve.

Yet another object of the present invention is to provide an inexpensive solenoid operated control valve assembly which avoids the use of a shim to set the minimum air gap.

It is yet another object of the present invention to provide a control valve including an actuator and valve plunger wherein a valve plunger guide is positioned in the upper portion of the actuator.

Still another object of the present invention is to provide a control valve assembly wherein one part serves as both a valve plunger guide and plunger stop for setting the minimum air gap.

Another object of the present invention is to provide a solenoid operated control valve wherein the armature does not impact any other valve part during operation.

Another object of the present invention is to provide a solenoid operated control valve which minimizes the tolerance stack-up during assembly to ensure effective setting of the minimum air gap.

Still another object of the present invention is to provide a solenoid operated control valve capable of maximizing the efficiency of the solenoid assembly by minimizing the current necessary to maintain the valve plunger in the energized position.

Yet another object of the present invention is to provide a solenoid-operated valve capable of minimizing valve plunger bounce.

It is another object of the present invention to provide a solenoid-operated valve capable of minimizing valve seat wear.

It is a further object of the present invention to provide a solenoid-operated valve capable of minimizing valve plunger impact velocity.

It is a yet another object of the present invention to provide a solenoid-operated valve capable of damping the impact force of the valve plunger against the valve seat.

These and other objects are achieved by providing a valve actuator assembly for actuating a fluid flow control valve having a valve plunger mounted for reciprocal movement between open and closed positions, comprising an actuator housing and a solenoid assembly for causing axial movement of the plunger along a longitudinal axis between the open and closed positions, wherein the solenoid assembly includes a stator including a first end and a second end positioned opposite the first end, a coil positioned around the stator, a central aperture extending through the stator for receiving the plunger and an armature connectable to the plunger and positioned a spaced axial distance along the longitudinal axis from the coil. The valve actuator assembly further includes a valve plunger stop including an elongated body portion extending through the central aperture from the first end to the second of the stator. The elongated body portion includes a stop surface positioned adjacent the second end of the stator for abutment by the plunger to define one of the open and the closed positions.

The stop surface may be positioned outside the central aperture to define a minimum air gap between the armature and the stator when the plunger is in abutment with the stop surface. The valve plunger stop may include an inner bore for receiving the plunger and a guiding surface positioned in the inner bore for guiding the plunger during movement between the open and the closed positions. The inner bore may extend completely through the valve plunger stop for housing a calibration device positioned adjacent the first end of the stator. The calibration device may include a coil spring positioned in the central aperture for biasing the plunger in a first direction. The valve plunger stop may include an annular flange portion extending radially outward from the elongated body portion, and the annular flange portion may be integrally formed as one piece with the elongated body portion for mounting against the actuator housing.

Thus the valve plunger stop may be in the form of a plunger guide and stop device including a one-piece guide body including an integral guide surface positioned in the central aperture and an integral stop surface for periodic abutment by the plunger. The guide surface may be positioned radially between the valve plunger and the stator.

The present invention is also directed to a flow control valve for controlling the flow of fuel in a fuel system, comprising a valve housing including an inlet passage, an outlet passage and a valve seat. The flow control valve also includes a valve plunger assembly mounted in the valve housing for reciprocal movement between an open position permitting fuel flow from the inlet to the outlet passage and a closed positioned against the valve seat for blocking flow through the outlet passage. The flow control valve also includes an actuator for moving the plunger assembly between the open and closed positions and a plunger overtravel impact limiting device for minimizing an impact force of the plunger assembly against the valve seat. The plunger overtravel impact limiting device includes a valve head mounted on the valve plunger assembly for axial movement relative to the valve plunger assembly and a biasing device mounted on the valve plunger assembly for biasing the valve head toward the valve seat. The plunger overtravel impact limiting device also includes a hydraulic damping device for decelerating the movement of the valve plunger assembly when moving into the closed position. The hydraulic damping device may include a fluid passage formed between the valve plunger assembly and the valve housing, wherein the fluid passage decreases in size as the valve plunger assembly moves toward the closed position to compress fluid in the fluid passage. The actuator may include an armature mounted on the plunger assembly and the plunger assembly may include an armature retainer for retaining the armature. The fluid passage is formed between the opposed surfaces of the armature retainer and the valve housing. The hydraulic damping device is preferably positioned axially along the valve plunger assembly between the armature and the valve head. The biasing device may include a coil spring, wherein the hydraulic damping device is positioned axial along the valve plunger assembly between the armature and the coil spring.

DETAILED DESCRIPTION OF THE PREFERRED EMBODIMENT

Figure 1:
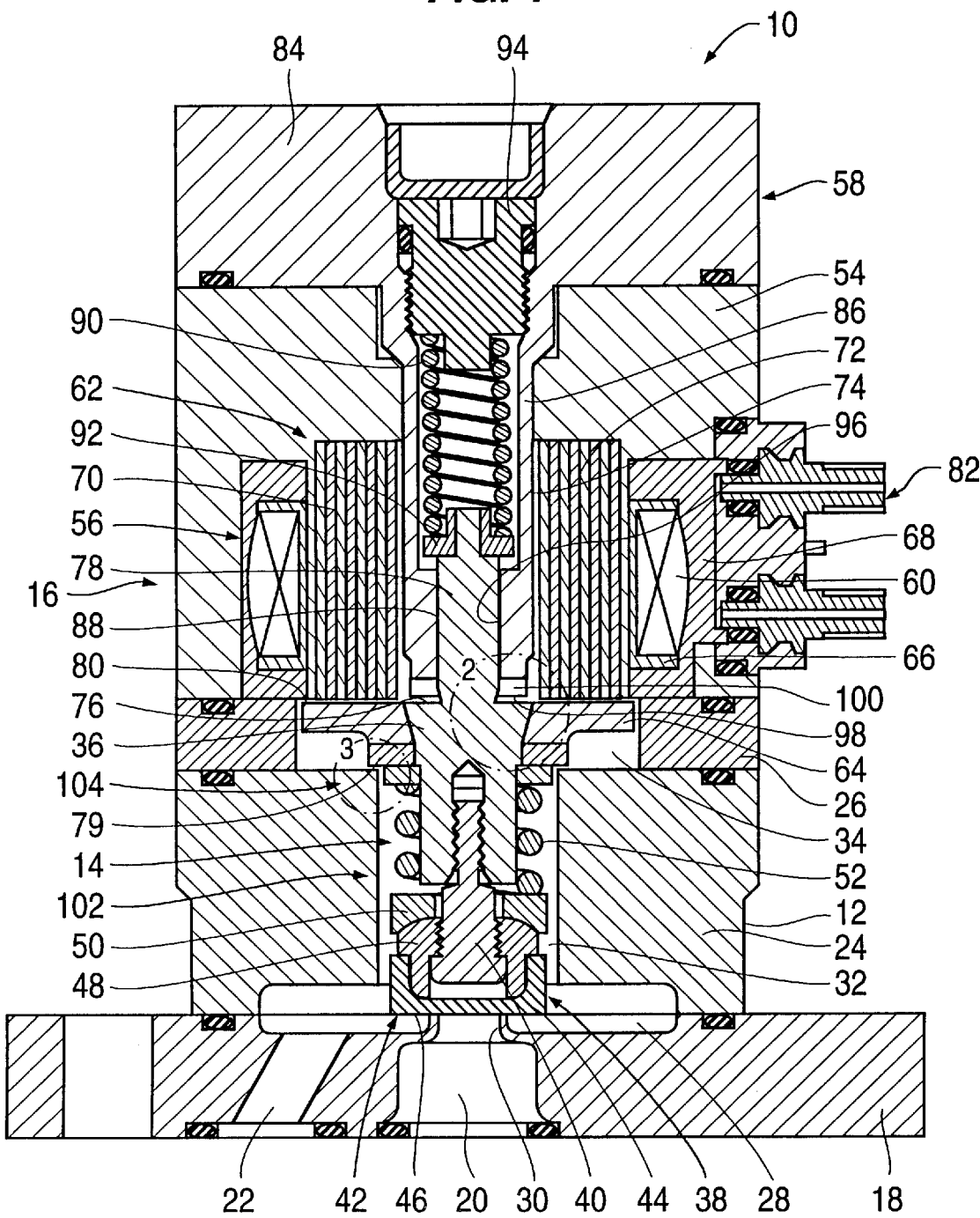
FIG. 1 is a cross-sectional view of the solenoid operated control valve of the present invention.

Referring to FIG. 1, there is shown the fluid flow control valve of the present invention, indicated generally at 10, for effectively controlling the flow of a fluid in a fluid system, such as the flow of fuel through a fuel injection system in an internal combustion engine. Flow control valve 10 generally includes a valve housing 12, a valve plunger assembly 14 mounted for reciprocal movement in valve housing 12 and a valve actuator assembly 16 for selectively moving valve plunger assembly 14 between open and closed positions. The combination of features of flow control valve 10 discussed hereinbelow create a compact, inexpensive valve assembly capable of effectively and precisely controlling fluid flow while minimizing valve wear during operation.

Valve housing 12 includes a supporting plate 18 including an inlet passage 20 and an outlet passage 22 formed therein, an upper portion 24 securely mounted on supporting plate 18 and a spacer 26 positioned on top of upper portion 24. A receiving cavity 28 is formed between upper portion 24 and supporting plate 18 to receive fuel flow from inlet passage 20 when valve plunger assembly 14 is in the open position and direct the fuel flow into outlet passage 22 communicating with cavity 28. A valve seat 30 is formed on supporting plate 18 around one end of inlet passage 20 for sealing abutment by valve plunger assembly 14 when in the closed position. Upper portion 24 includes a receiving bore 32 opening at one end into receiving cavity 28 and at an opposite end into a spacer bore 34 formed in spacer 26.

Figure 3:
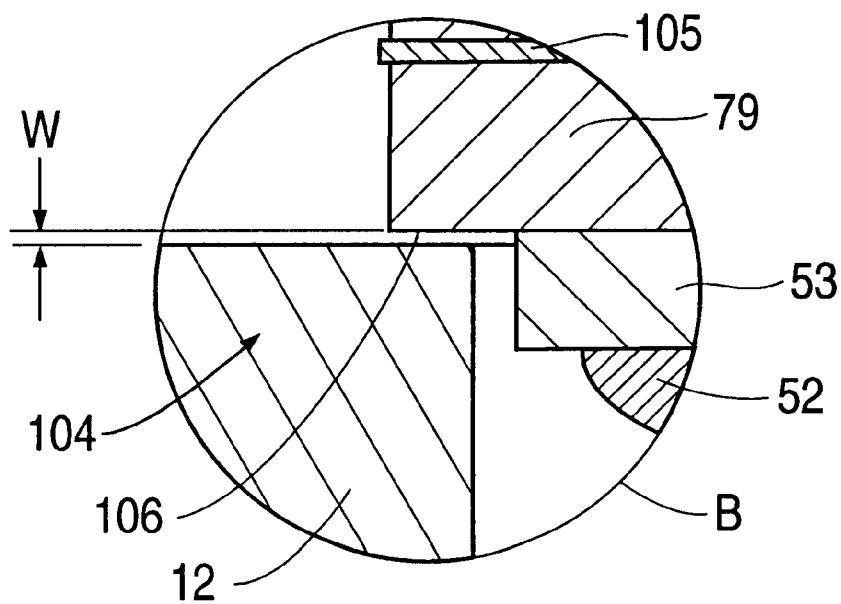
FIG. 3 is an expanded view of area B in FIG. 1.

Valve plunger assembly 14 includes a valve plunger 36 positioned in spacer bore 34 and receiving bore 32, and a valve head 38 mounted on one end of valve plunger 36 adjacent valve seat 30. Valve head 38 includes a connector piece 40 threadably connected to valve plunger 36 and extending downwardly as shown in FIG. 1 toward valve seat 30. Valve head 38 also includes a three-part head alignment assembly 42 including an outer part 44 having a valve seating surface 46 for engaging valve seat 30, an intermediate part 48 and a spring seat part 50. Intermediate part 48 and spring seat part 50 each include a central aperture for receiving connector piece 40 while outer part 44 is securely attached to intermediate part 48. In this manner, three-part head alignment assembly 42 can be securely attached to the end of valve plunger 36 by inserting connector piece 40 through the apertures of intermediate part 48 and spring seat part 50, threadable securing connector piece 40 into a threaded bore in the end of valve plunger 36 and attaching outer part 44 to intermediate part 48. A biasing spring 52 positioned around the lower end of valve plunger 36 seats against the upper surface of spring seat part 50 at one end and against a spring seat plate 53 at an opposite end (FIG. 3). The upper surface of intermediate part 48 includes a semi-spherical surface for abutment by a complementary shaped lower surface formed on spring seat part 50. The spherical connection and the relative movement permitted between assembly 42 and connector piece 40 ensures that valve seating surface 46 will align with, and sealingly seat against, valve seat 30 when valve plunger assembly 14 is in the closed position as shown in FIG. 1.

Valve actuator assembly 16 includes an actuator housing 54, a solenoid assembly 56 mounted in actuator housing 54 and a valve plunger guide and stop 58 for guiding plunger 36 through reciprocal movement while stopping the movement of valve plunger 36 in one direction. Solenoid assembly 56 includes a coil 60, a stator 62 and an armature 64. The coil 60 is wrapped concentrically around a bobbin 66 and positioned in a coil casing 68. Coil 60 and bobbin 66 encircle stator 62 so that stator 62 extends completely through coil 60. Stator 62 is preferably formed as a laminated core having a plurality of laminated stacks 70 and 72. Each of these stacks 70, 72 are formed from laminated elements of magnetic or paramagnetic material laminated together. Stator 62 includes a central aperture 74 formed by the positioning of the laminant stacks. Valve actuator assembly 16 is mounted on valve housing 12 so that actuator housing 54 abuts spacer 26 and central aperture 74 opens into spacer bore 34. Valve plunger 36 includes an annular land 76 positioned in spacer bore 34 and facing central aperture 74, and a plunger extension 78 extending from annular land 76 into central aperture 74. Armature 64 is mounted on valve plunger 36 via an armature retainer 79 and positioned in spacer bore 34. Armature 64 is a generally rectangular shaped disc including an upper surface 80 extending outwardly from valve plunger 36, and preferably positioned in the same plane as, annular land 76, as most clearly shown in FIG. 2. Valve actuator assembly 16 is provided with an electrical signal from an electronic control module (ECM—not shown) via a conventional terminal connection indicated at 82 to energize solenoid assembly 56 causing valve plunger assembly 14 to move from the closed position shown in FIG. 1, upwardly toward an open position allowing fluid flow between valve seat 30 and valve seating surface 46.

Valve plunger guide and stop 58 includes an annular flange portion 84 mounted in abutment with actuator housing 54 and an elongated guide body portion 86 integrally formed on annular flange portion 84. Elongated guide body portion 86 extends downwardly as shown in FIG. 1 into actuator housing 54 and through central aperture 74 of stator 62. Valve plunger guide and stop 58 includes an inner bore 88 extending completely through annular flange portion 84 and elongated guide body portion 86. Plunger extension 78 extends into inner bore 88 and terminates in central aperture 74. A coil spring 90 is mounted in inner bore 88 for biasing valve plunger assembly 14 into the closed position as shown in FIG. 1. One end of coil spring 90 abuts a spring seat 92 positioned on the outer end of plunger extension 78 while the opposite end of coil spring 90 abuts a calibration plug 94 threadably secured in the outer end of inner bore 88. Calibration plug 94 is used to adjust the quantity of fuel flow through valve seat 30 for a given actuation event. This slight variation in the fuel flow is achieved without varying the energization period of solenoid assembly 56 by selectively varying the biasing force provided by coil spring 90. The biasing force of coil spring 90 against plunger assembly 14, and thus plunger assembly 14 against valve seat 30, is dependent on the compression of coil spring 90. Thus, this compression of coil spring 90 can be modified by rotating calibration plug 94 to axially move plug 94 relative to the outer end of coil spring 90. In this manner, the rate of opening and closing of valve plunger assembly 14 can be selectively varied to set or calibrate the flow control valve 10 to achieve a desired fuel flow result.

Figure 2:
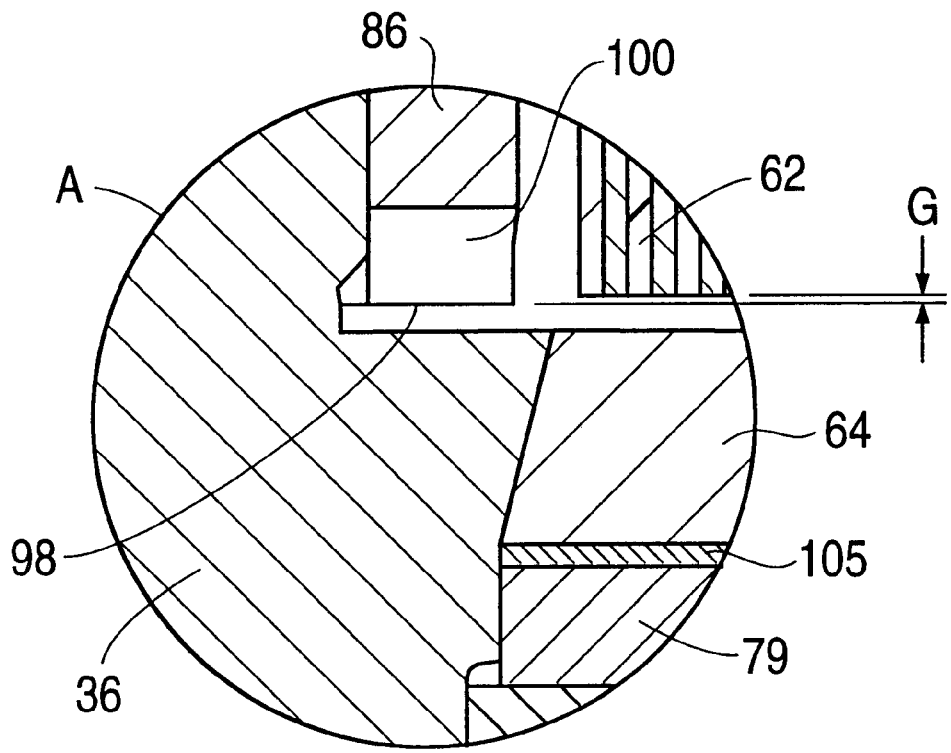
FIG. 2 is an expanded view of area A in FIG. 1.

Elongated guide body portion 86 includes an annular guide surface 96 formed at its distal end adjacent to plunger extension 78. Annular guide surface 96 is generally cylindrically shaped in a complementary fashion to the outer surface of plunger extension 78 so as to create a sliding fit between plunger extension 78 and the guide surface 96. In this manner, guide surface 96 functions to guide valve plunger 36 through its reciprocal movement between the open and closed positions. The inner distal end of elongated guide portion 86 includes a stop surface 98 for abutment by annular land 76 when valve plunger assembly 14 reaches the fully opened position. As best shown in FIG. 2, stop surface 98 is a generally planar surface extending parallel to annular land 76. Stop surface 98 may be in the form of an annular surface extending continuously around the distal end of guide body portion 86. Alternatively, as shown in FIG. 2, one or more cross passages 100 may be formed in the distal end of guide body portion 86 to create a plurality of stop surfaces 98 (FIG. 1). Cross passages 100 function to permit the unhindered flow of fuel from the space between stop surface 98 and annular land 76 as land 76 moves toward stop surfaces 98. Thus, cross passages 100 prevent fuel from being captured and compressed in the space between stop surface 98 and land 76 thereby ensuring unrestricted movement of valve plunger 36 into the open position.

Referring to FIG. 2, stop surface 98 serves an important function in defining the minimum air gap G between armature 64 and the lower end of stator 62 when land 76 abuts stop surface 98. An air gap must be maintained between armature 64 and stator 62 to prevent armature 64 from being held against stator 62 when solenoid assembly 56 is de-energized due to residual magnetism thereby ensuring precise and predictable movement of valve plunger assembly 14. In addition, it is desirable to minimize the air gap to reduce the current of the solenoid assembly 56 required to maintaining valve plunger assembly 14 in the energized, i.e. open, position. The smaller the air gap, the less current required to generate the same magnetic attractive forces necessary to hold armature 64 in the open position with annular land 76 in abutment with stop surface 98. It should be noted that the flow control valve of the present invention maximizes solenoid efficiency while minimizing armature wear by permitting the use of an armature 64 having significant surface area relative to the lower end of stator 62 while avoiding any contact between armature 64 and stop surface 98 thereby avoiding armature wear and damage. In addition, it is desirable to control the tolerances affecting the size of minimum air gap G so as to reduce the variation in performance from one valve assembly to the next. Valve plunger guide and stop 58 effectively defines minimum air gap G in a given flow control valve while also minimizing adverse tolerance stack-up upon assembly thereby reducing the variation in the size of minimum air gap G between different valve actuator assemblies thus reducing the variation in performance between control valves. The present valve actuator assembly 16 achieves these important advantages by forming stop surface 98 integrally on the one-piece valve plunger guide and stop 58. The mounting of one-piece valve guide and stop 58 on actuator housing 54 determines the axial position of stop surface 98 relative to the lower end of stator 62 thereby defining minimum air gap G. Other conventional valve designs rely on a plurality of components to define the position of the stop surface thus often resulting in unacceptable tolerance stackup creating variations in the air gap and ultimately requiring a shim between the components to obtain the proper air gap size. Other conventional valve assemblies allow the valve plunger/armature to impact the stator to define the energized position while positioning a shim between the plunger/armature and the stator to prevent the undesired direct contact between the components. These latter conventional valves therefore rely on the shim to define the separation distance between the stator and valve plunger/armature thereby undesirably adding to the manufacturing and assembly costs of the actuator/valve. The valve plunger guide and stop 58 of the present invention causes the minimum air gap G to be set automatically upon assembly of the guide and stop 58 onto the actuator housing 54 while minimizing the tolerances around the gap thereby avoiding the need for further adjustments or shims. Thus, the length of guide body portion 86 relative to the axial position of the lower end of stator 62 is the only relative dimensional comparison that must be considered to achieve and optimize minimum air gap G. In addition, the integration of guide surfaces 96 on elongated guide body portion 86 permits plunger extension 78 to be effectively guided throughout movement while being positioned in an overlapping manner with the axial extent of stator 62. This arrangement minimizes the length of the flow control valve and avoids the need for a separate component for guiding the plunger assembly 14. Thus, one component, the valve plunger guide and stop 58, functions to define minimum air gap G, guide valve plunger assembly 14, and in addition, support calibration plug 94 and coil spring 90.

The present invention also includes a plunger overtravel impact limiting device indicated generally at 102 in FIG. 1, which includes valve head 38 and biasing spring 52, and the hydraulic damping device 104. As discussed hereinabove, valve head 38 is mounted for axial movement relative to valve plunger 36 and biased toward valve seat 30 by biasing spring 52. The biasing force of biasing spring 52 is greater than the biasing force of coil spring 90 thereby allowing valve head 38 to move relative to valve plunger 36 when valve head 38 contacts valve seat 30 as it moves into the closed position as shown in FIG. 1. Thus, when valve seating surface 46 contacts valve seat 30 and the movement of valve head 38 terminates, valve plunger 36 will continue moving downwardly toward valve seat 30 under the bias force of coil spring 90 and against the biasing force of coil spring 52. Thus, the translational energy of valve plunger 36 will be at least partially absorbed by coil spring 52 instead of being transferred to valve seat 30 thereby reducing the impact of valve head 38 against valve seat 30. As a result, valve seat wear and the possibility of the valve head 38 bouncing off of valve seat 30 upon impact is significantly reduced.

As shown in FIG. 3, hydraulic damping device 104 includes a fluid passage 106 positioned between armature retainer 79 and valve housing 12. The width W of fluid passage 106 determines the permitted overtravel of plunger 36 after valve head 38 has contacted valve seat 30 when moving into the closed position. A shim 105 may be used to obtain the desired width W. The width W of fluid passage 106 is critical in determining the degree of damping achieved by hydraulic damping device 104. During operation, with flow control valve 10 in the closed position as shown in FIGS. 1 and 3, fuel is present in receiving bore 32, fluid passage 106 and spacer bore 34. When valve head 38 moves into the closed position in contact with valve seat 30, armature retainer 79 begins to move closer to the opposing surface on valve housing 12 at a relatively high velocity thereby squeezing fuel out of fluid passage 106. As the fluid is squeezed out fluid passage 106, there is a dramatic decrease in the velocity of valve plunger 36 before retainer 79 contacts valve housing 12. This hydraulic dampening, or squeeze film damping, not only minimizes the amount of energy transmitted to valve seat 30 thereby reducing valve seat wear but, perhaps more importantly, greatly minimizes the likelihood of valve bounce by absorbing the energy of plunger 36 as it moves through the overtravel stroke thus quickly reducing the energy and force transmitted to valve seat 30 by valve plunger 36.

INDUSTRIAL APPLICABILITY

The control valve of the present invention may be utilized in any system requiring the ability to control the flow of fluid between a source and a load, especially where very precise control of fluid flow is desired. Specifically, the control valve of the present invention is particularly suited for use in a fuel system of an internal combustion engine.

We claim:

1. A valve actuator assembly for actuating a fluid flow control valve having a valve plunger mounted for reciprocal movement between open and closed positions, comprising:

an actuator housing;

a solenoid assembly for causing axial movement of the plunger along a longitudinal axis between said open and closed positions, said solenoid assembly including a stator including a first end and a second end positioned opposite said first end, a coil positioned around said stator, a central aperture extending through said stator from said first end to said second end for receiving the plunger and an armature connectable to the plunger and positioned a spaced axial distance along said longitudinal axis from said coil;

a valve plunger stop including an elongated body portion extending through said central aperture from said first end to said second end of said stator, said elongated body portion including a stop surface positioned adjacent said second end of said stator for abutment by the plunger to define one of the open and the closed positions.

2. The actuator assembly of claim 1, wherein said stop surface is positioned outside said central aperture to define a minimum air gap between said armature and said stator when the plunger is in abutment with said stop surface.

3. The actuator assembly of claim 1, wherein said valve plunger stop includes an inner bore for receiving the plunger and a guiding surface positioned in said inner bore for guiding the plunger during movement between the open and the closed positions.

4. The actuator assembly of claim 3, wherein said inner bore extends completely through said valve plunger stop, the actuator assembly further including a calibration means positioned in said inner bore adjacent said first end of said stator.

5. The actuator assembly of claim 4, wherein said calibration means includes a coil spring for biasing the plunger in a first direction, said coil spring positioned in said central aperture.

6. The actuator assembly of claim 1, wherein said valve plunger stop includes an annular flange portion extending radially outwardly from said elongated body portion.

7. The actuator assembly of claim 6, wherein said elongated body portion and said annular flange portion are integrally formed as one piece for mounting against said actuator housing.

8. A flow control valve for controlling the flow of fuel in a fuel system, comprising:
    a valve housing including an inlet passage and an outlet passage;
    a valve plunger mounted in said valve housing for reciprocal movement between an open position permitting fuel flow from said inlet to said outlet passage and a closed position blocking flow through said outlet passage;
    an actuator means for moving said valve plunger between said open and closed positions, said actuator means including a solenoid assembly including a coil, a stator, a central aperture extending through said stator and an armature connected to said valve plunger, said valve plunger positioned in said central aperture; and
    a plunger guide and stop means for guiding said plunger during movement between said open and said closed positions, said plunger guide and stop means including a one-piece guide body including an integral guide surface positioned in said central aperture and an integral stop surface for periodic abutment by said plunger when said plunger is in one of said open and said closed positions, said guide surface positioned radially between said valve plunger and said stator.

9. The actuator assembly of claim 8, wherein said stop surface is positioned outside said central aperture to define a minimum air gap between said armature and said stator when said valve plunger is in abutment with said integral stop surface.

10. The actuator assembly of claim 8, wherein said one-piece guide body includes an inner bore for receiving said valve plunger, said guide surface being positioned in said inner bore.

11. The actuator assembly of claim 10, wherein said inner bore extends completely through said one-piece guide body and said armature is positioned on a first side of said stator, the flow control valve further including a calibration means positioned in said inner bore on a second side of said stator opposite said first side.

12. The actuator assembly of claim 11, wherein said calibration means includes a coil spring for biasing said valve plunger in a first direction, said coil spring positioned in said central aperture.

13. The actuator assembly of claim 8, wherein said one-piece guide body includes an annular flange portion extending radially outwardly for connection to said valve housing.

14. The actuator assembly of claim 8, wherein said valve housing further includes a valve seat for abutment by said valve plunger when said valve plunger is in said closed position and a plunger overtravel impact limiting means for minimizing an impact force of said valve plunger against said valve seat, said plunger overtravel impact limiting means including a valve head mounted on said valve plunger for axial movement relative to said valve plunger and a hydraulic damping means for decelerating the movement of said valve plunger when moving into said closed position.

15. A flow control valve for controlling the flow of fuel in a fuel system, comprising:
    a valve housing including an inlet passage, an outlet passage and a valve seat;
    a valve plunger assembly mounted in said valve housing for reciprocal movement between an open position permitting fuel flow from said inlet to said outlet passage and a closed position against said valve seat for blocking flow through said outlet passage;
    an actuator means for moving said valve plunger assembly between said open and closed positions; and
    a plunger overtravel impact limiting means for minimizing an impact force of said plunger assembly against said valve seat, said plunger overtravel impact limiting means including a valve head mounted on said valve plunger assembly for axial movement relative to said valve plunger assembly, and a hydraulic damping means for decelerating the movement of said valve plunger assembly when moving into said closed position wherein said actuator means includes a solenoid assembly including a coil, a stator and a central aperture extending through said stator, the flow control valve further including a plunger guide and stop means for guiding said valve plunger assembly during movement between said open and said closed positions, said plunger guide and stop means including a one-piece guide body including an integral guide surface positioned in said central aperture and an integral stop surface for periodic abutment by said valve plunger assembly when said valve plunger assembly is in one of said open and said closed positions, said guide surface positioned radially between said valve plunger assembly and said stator.

16. The flow control valve of claim 15, wherein said hydraulic damping means includes a fluid passage formed between said valve plunger assembly and said valve housing, said fluid passage decreasing in size as said valve plunger assembly moves toward the closed position so as to compress fluid in said fluid passage.

17. The flow control valve of claim 16, wherein said actuator means includes an armature mounted on said plunger assembly and said valve plunger assembly includes an armature retainer, said fluid passage being formed between opposed surfaces of said armature retainer and said valve housing.

18. The flow control valve of claim 15, wherein said actuator means includes an armature mounted on said plunger assembly, said hydraulic damping means being positioned axially along said valve plunger assembly between said armature and said valve head.

19. The flow control device of claim 15, further including a biasing means mounted on said valve plunger assembly for biasing said valve head toward said valve seat, said biasing means including a coil spring, said hydraulic damping means being positioned axially along said valve plunger assembly between said armature and said coil spring.

* * * * *